(12) United States Patent
Tello et al.

(10) Patent No.: US 6,381,634 B1
(45) Date of Patent: *Apr. 30, 2002

(54) APPARATUS AND METHOD FOR ELECTRONIC MAIL ADDRESS PORTABILITY

(75) Inventors: Antonio G. Tello, Garland; Keith Melkild, Plano, both of TX (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,900

(22) Filed: Dec. 8, 1997

(51) Int. Cl.[7] ............................................... G06F 15/16
(52) U.S. Cl. ........................ 709/206; 709/217; 709/219
(58) Field of Search ................................ 709/203, 206, 709/200, 218, 228, 217, 9, 219

(56) References Cited

U.S. PATENT DOCUMENTS

| 5,684,951 A | * 11/1997 | Goldman et al. | 707/9 |
|---|---|---|---|
| 5,751,960 A | * 5/1998 | Matsunaga | 709/206 |
| 5,822,526 A | * 10/1998 | Waskiewicz | 709/206 |
| 5,835,718 A | * 11/1998 | Blewett | 709/218 |
| 5,844,969 A | * 12/1998 | Goldman et al. | 709/200 |
| 5,933,490 A | * 8/1999 | White et al. | 379/221 |
| 5,987,508 A | * 11/1999 | Agraharam et al. | 709/217 |
| 6,012,088 A | * 1/2000 | Li et al. | 709/219 |
| 6,145,002 A | * 11/2000 | Srinivasan | 709/225 |

FOREIGN PATENT DOCUMENTS

| GB | 2310739 | 9/1997 |
|---|---|---|
| WO | 96/09714 | 3/1996 |
| WO | 97/28553 | 8/1997 |

OTHER PUBLICATIONS

Stevens, "TCP/IP Illustrated, vol. 1: The Protocols", 1994.*
Stevens, "TCP/IP Illstrated, vol. 1: The Protocols", 1994.*

* cited by examiner

*Primary Examiner*—Ayaz Sheikh
*Assistant Examiner*—Philip B. Tran
(74) *Attorney, Agent, or Firm*—Carr & Storm, L.L.P.

(57) ABSTRACT

A method and apparatus for e-mail address portability are provided. A service control point on the Internet comprises an e-mail address database and a transaction processing object. The e-mail address database has at least a well-known-address field for storing a well-known address value and a literal address field for storing a literal address value that corresponds to the well-known-address value. The transaction processing object, when called with an address translation request, accesses the e-mail address database. The address translation request has a well-known address value which is translated to the corresponding literal address value. After the translation, the transaction processing object returns the corresponding literal address value to the calling routine.

11 Claims, 2 Drawing Sheets

APPARATUS AND METHOD FOR ELECTRONIC MAIL ADDRESS PORTABILITY

TECHNICAL FIELD

The present invention relates in general to electronic mail ("e-mail") address portability and, in particular, to portability of e-mail addresses between different Internet service providers.

BACKGROUND OF THE INVENTION

To access the Internet, a user must typically subscribe to an Internet Service Provider ("ISP"), which provides basic operations for Internet access. Each ISP has a unique Internet protocol ("IP") address associated with it to allow e-mail to be sent to the service provider and then placed in the personal directory of the subscriber or user.

With the proliferation of ISPs, service costs decrease and can tempt users to change their present ISPs. But by leaving their present ISP, the user also leaves behind their e-mail address. Furthermore, after changing to the new ISP the subscriber must reprint their business stationary to the new e-mail address and send announcements to each customer and acquaintance regarding the change. Thus, with each ISP change, the user risks losing contact with people, customers and services.

E-mail forwarding services have been implemented to allow an Internet user to keep the same e-mail address while changing ISPs. A forwarding service is simply another "server" or secondary ISP in the Internet having an IP address to receive e-mail. The forwarding service retains a forwarding IP address, which is the present or primary ISP of the user. The forwarding service then receives the e-mail, replaces the IP address on the e-mail with the forwarding address of the user, and forwards the e-mail.

Other forms of "portable" e-mail address have been implemented with an Internet web-based e-mail service. This is simply a web site that is accessible by a user through an Internet browser. To retrieve their mail, users access the Internet and then go to that web site or IP address and look in their mail directory.

But present e-mail systems can limit the data throughput, speed, and reliability enjoyed by Internet users. Communications transmission rates are diminished by adding yet another link in an already lengthy e-mail chain, causing reduced e-mail transfer rates. Furthermore, funneling e-mail to a single third-party server or site before the destination IP address can reduce communication throughput, resulting in e-mail delays.

Transmission reliability is also at risk. The Internet was designed to provide a multiple-redundancy infrastructure where if one node or server fails, a user can still receive their e-mail messages. Because an e-mail forwarding server becomes a conduit for e-mail of a user, when the forwarding server fails, the user e-mail comes to a halt instead of being re-routed through another Internet path.

Another drawback of third-party mail servers or web sites is message security. The intermediate IP destination address potentially exposes the substance of e-mail messages to unrestricted access or interception by third parties.

Departing from Internet-based forwarding services, a system has existed for telephony applications in the form of telephony service control points. These telephony systems allow a user to change long-distance service providers while keeping the same toll-free number, that is, translating "1-800" or "1-888" numbers to a new POTS ("Plain Old Telephone System") number or a trunk group.

But the intricate telephony signaling protocols, such as Signaling System 7 ("SS7"), and the telephony infrastructures are not compatible with Internet signaling and messaging protocols—primarily TCP ("Transmission Control Protocol") and IP ("Internet Protocol")—and the open infrastructure of the Internet. That is, the Internet is a collection of an estimated 10 million computers, networks and gateways interlinked by the Internet Protocol ("IP").

Thus, there exists a need for portable e-mail addresses that can be retained by an Internet user, even when they change their ISP. There also exists a need for a portable e-mail address that maintains customary communications data rates, and limits unnecessary e-mail access to third parties.

SUMMARY OF THE INVENTION

These and other disadvantages are overcome by the present invention, which provides a method and apparatus for e-mail address portability.

According to one aspect of the present invention, an Internet service control point implemented by a computer is provided. The Internet service control point has an e-mail address database and a transaction processing object. The e-mail address database has at least a well-known address field for storing a well-known address value, and a literal-address field for storing a literal-address value that corresponds to the well-known address value. Generally, the well-known address value is selected by the Internet user. This address is portable to the Internet user when an ISP is changed. The literal-address value is a server address designated by the ISP that changes when the ISP is changed. Also provided is a transaction processing object that, when called with an address translation request, accesses the e-mail address database. The address translation request has a well-known address value which is translated to the corresponding literal address value. After the translation, the transaction processing object returns the corresponding literal address value.

In another aspect of the invention, a method for portable e-mail service is provided. The method translates a well-known address to a literal address. The translation takes place through a transaction processing object. The transaction processing object accesses a database containing address information, and translates the well-known address value to the corresponding literal address value, returning the corresponding literal address value.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

The principles of the present invention and their advantages are best understood by referring to the embodiment depicted in FIGS. 1–5, in which like reference numbers describe like parts.

A variety of communication protocols and interfaces exist, such as Ethernet, X.25 (a communications standard between a terminal and a packet switching network), Signaling System 7 ("SS7"), Asynchronous Transfer Mode (ATM), Plain-Old-Telephone-System ("POTS"), Integrated Services Digital Network ("ISDN") and the like, that allow computers—of all sizes, from different computer vendors, with different operating systems—to communicate with each other. But in Internet usage, the standard communications protocol is the TCP/IP protocol suite. The Internet structure is considered an open system in that the definition of the protocol suite and many of its implementations are publicly available.

Figure 1:
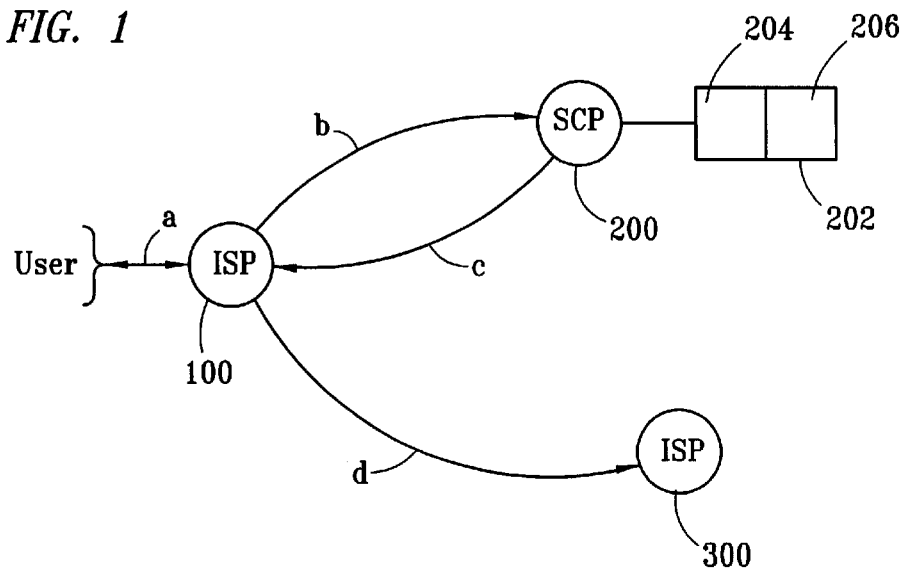
FIG. 1 illustrates the operation of the invention on a portion of the Internet.

FIG. 1 illustrates the operation of the invention on a portion of the Internet. The communication paths a, b, c, and d, depict communication flow and do not represent the physical telecommunications infrastructure providing network server interconnects.

In FIG. 1, the Internet portion has a first Internet Service Provider ("ISP") 100, in communication with a translator or Service Control Point ("SCP") 200 through communications paths "b" and "c," and a second ISP 300 in communication with the first ISP 100 through communications path d. The term Service Control Point as used herein means a computer that enables an ISP to offer enhanced services by: (1) acting on the format, content, code, protocol or similar aspects of transmitted information; (2) providing additional or restructured information; or (3) involving subscriber interaction with stored data. In the present embodiment, the SCP has an object programming code module to provide subscribers with stored data that includes at least a literal address value corresponding to a well-known address value. The term "object" as used throughout is a shorthand term for object code; in object-oriented programming, an object is a variable comprising both routines and data that is treated as a discrete entity. An example of an object-oriented programming language is C++. With respect to programming languages generally, the term "object" means a routine, a subroutine, data, and/or a combination of these to provide a programming function.

Every interface on the Internet must have a unique IP address (or designator). For example, the first ISP 100 has an IP address of 140.252.13.33 ("stuff.net"), the second ISP 300 has an IP address of 140.255.160.22 ("commercial_isp.com"), and SCP 200 has an IP address of 140.255.23.11 ("translation.scp"). The SCP 200 has an e-mail database 202 having a well-known address field 204 for storing corresponding well-known-address values. In this example, the well-known address is "name@@wellknown." The e-mail database 202 also has a literal address field 206 for storing literal address values, each corresponding to each well-known-address value. In this example the corresponding literal address value is "userx@commercial_isp.com." The SCP can be implemented with different computers, such as personal computers ("PC"), UNIX-based workstations, or devoted servers. Preferably, the SCP is an industry-hardened fault-tolerant telecommunications server. Such servers are extremely reliable and highly stable.

Internet components, first ISP 100, SCP 200, and second ISP 300, use an Internet communications protocol to provide Internet communications. Although several protocols exist, discussed herein is the TCP/IP protocol suite because of its predominance in the Internet.

Figure 2:
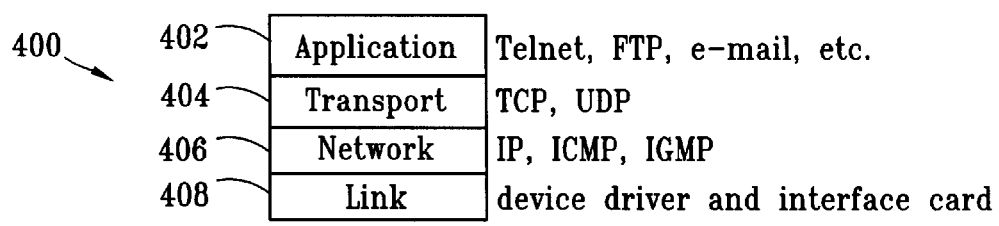
FIG. 2 illustrates a network protocol stack used in Internet communications, and particularly, to pass the portable e-mail information of the invention.

Referring to FIG. 2, shown is a network protocol stack 400 that is present on each of the first ISP 100, the second ISP 300, and the SCP 200. The network protocol stack 400 enables Internet communications, and particularly, passes portable e-mail information between these and other Internet components. Network protocol stack 400 includes: an application layer 420, a transport layer 440, a network or Internet layer 460, and a link layer 480.

Network application layer 402 handles the details of the particular application, such as e-mail handlers (e-mail daemons), or the like. The term "daemon" as used means a program that performs a utility function without being requested or even known of by the user. Network transport layer 404 provides a data flow between two hosts, such as between the first ISP 100 and the second ISP 300. Generally, the transport layer 404 uses TCP to (1) divide data passed to it from the application layer 402 into appropriately-sized blocks for the network layer 406, (2) acknowledging received packets, and (3) setting timeouts to make certain the receiving host acknowledges packets that are sent. Network layer 406 handles the movement of information packets around the network and is implemented by the IP. Link or network interface layer 408 includes the device driver or software component that permits the host operating system to communicate with a corresponding network interface card. The network interface layer is configured to support networks such as Ethernet, token ring, Fiber Distributed Data Interface, RS-232 serial lines, or the like. The network interface card provides communication connection "a" with the first ISP 100, shown in FIG. 1.

Figure 3:
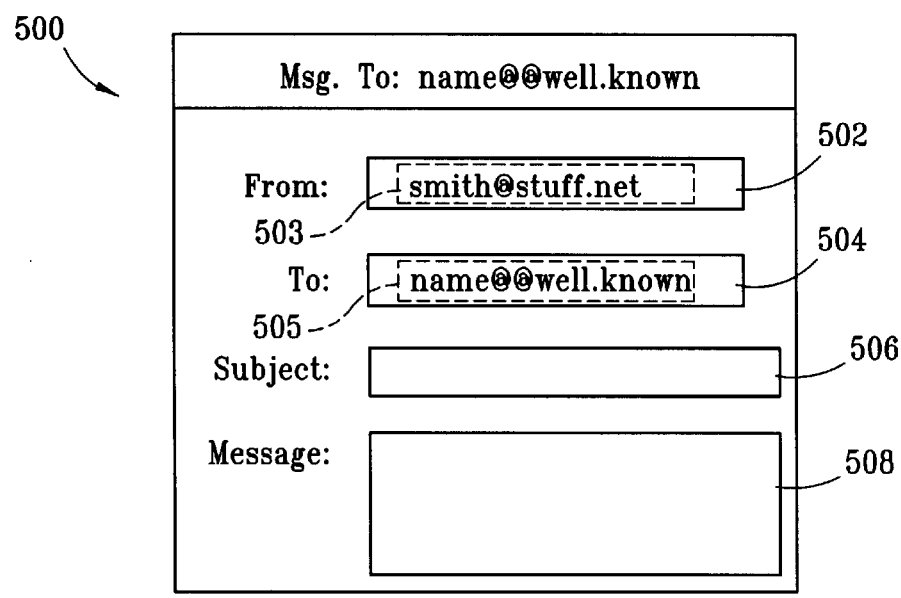
FIG. 3 is an e-mail interface screen showing implementation of the portable e-mail information of the invention.

Referring to FIG. 3, an e-mail interface screen 500 is illustrated. The term e-mail, as used herein, means the transmission of messages over a communications network either to individual recipients or in broadcast form to larger groups. The e-mail interface screen 500 is provided by the e-mail application program on the computer of the user, as is known by those skilled in the art. Such application programs are also referred to as a Graphics User Interface ("GUI"). The e-mail interface provides a "from" field 502 containing the e-mail address value 503 of the user (or sender), a "to" field 504 containing the well-known-name value 505 of the recipient, a "subject" field 506 and a "message" field 508. Both IP address values are shown in domain name format.

The presence of the portable e-mail service is indicated in the messaging headers (see FIGS. 4 and 5) by either a specialized-address format or by a software flag. The first ISP 100 has a mail daemon—a utility program that performs its function without being requested or even known by the user—that has an interpreter object "look in" or parse the e-mail submission for the SCP indicator. Such interpreter objects are well known to those skilled in the art.

An example of a specialized-address format is shown in FIG. 3. A well-known-name value 505 is inserted in field 504. The value 505 format indicates that a translation service or SCP 200 must be accessed by the first ISP 100 to retrieve a literal address value from SCP database 202. For example, the well-known name value shown is "name@@wellknown." The "@@" characters are a SCP indicator to alert the first ISP 100 that a SCP 200 must be accessed to acquire a literal address value. Other SCP indicator-types can be implemented to alert the first ISP 100 to request a translation from SCP 200, such as the e-mail application program of the user setting a software flag, or the like, as discussed above.

When the e-mail message is submitted to the first ISP 100, the domain name value of "stuff.net" is converted into a corresponding 32-bit IP address in dotted-decimal notation. Every interface on the Internet must have a unique IP address. For example, the first ISP 100 has an IP address of 140.252.13.33 ("stuff.net"), the second ISP 300 has an IP address of 140.255.160.22 ("commercial_isp.com"), and SCP 200 has an IP address (or designator) of 140.255.23.11 ("translation.scp"). For clarity, the alphanumeric domain names are used herein with the understanding that such alphanumeric addressing is conventionally represented in the communications standard as "dotted-decimal notation."

Figure 4:
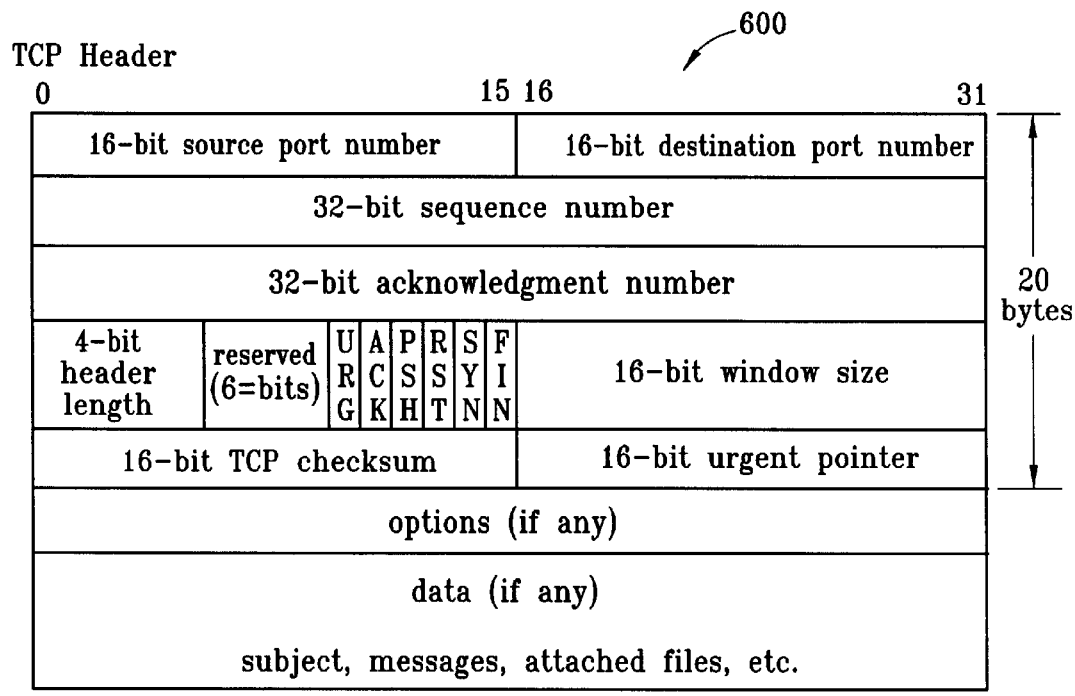
FIG. 4 is a TCP message format with a header and a data portion.
Figure 5:
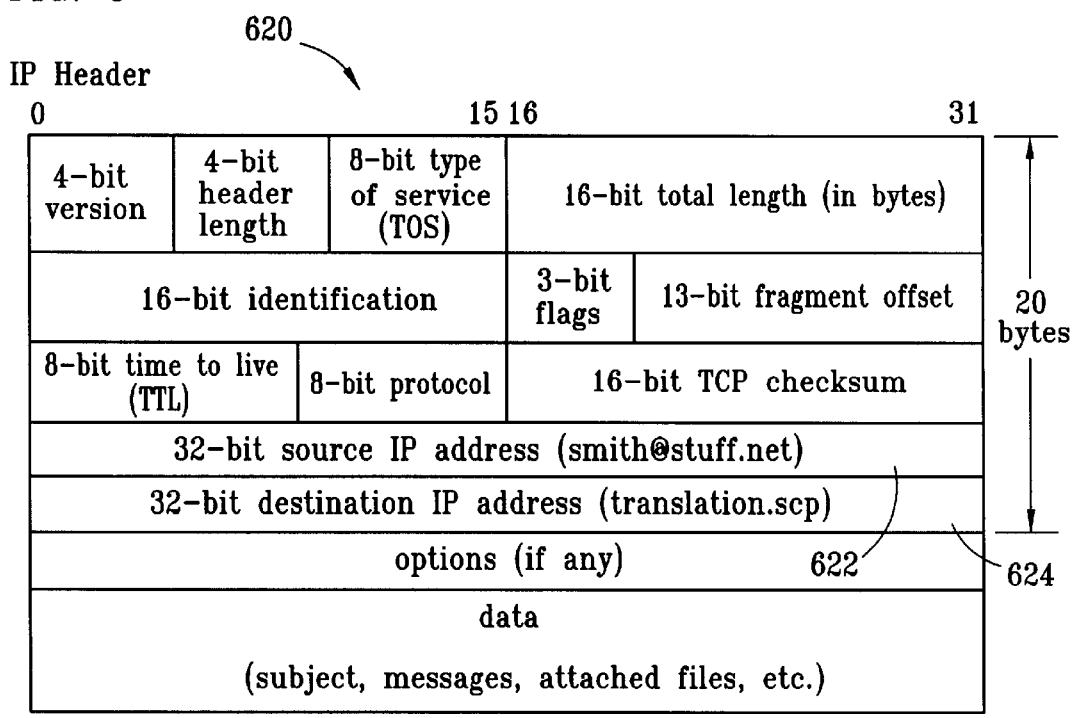
FIG. 5 is an IP message format with a header and a data portion containing the portable e-mail information of the invention.

Referring to FIGS. 4 and 5, shown is a TCP message 600 with header 602 and data portion 604, and an IP message 620 with header 622 and data portion 624. Information from the e-mail message submission of the user is arranged for the TCP/IP formats illustrated in FIGS. 4 and 5.

In FIG. 5, the source address "smith@stuff.net" is in the "source IP address" field 622, and the SCP 200 designation (or IP address) "translation.scp" is in the "destination IP address" field 624. Preferably, the user provides the first ISP 100 with the SCP IP designator "translation.scp" when he subscribes to the first ISP 100. But alternatively, the SCP 200, upon subscription by the user to the SCP service, provides the SCP IP designator to the first ISP 100.

The user is provided e-mail portability service through implementation of the SCP 200 into the Internet. Referring back to FIG. 1, the first ISP 100 submits an address translation request to SCP 200 for the literal address value of "name@@wellknown," as set out by communications path "b". SCP 200 translates the well-known name value into the corresponding literal address value "userx@commercial_isp.com" and returns this value to the first ISP 100 through communications path "c". The first ISP 100 then sends the e-mail message to this literal address using standard methods and communications protocols, as is known in the art. If there is not a corresponding literal address value or if there is an other error on the SCP 200, then an error message or a failure value is returned to the first ISP 100.

With the e-mail portable address system described herein, security and messaging throughput is improved over conventional e-mail forwarding services. First, the messaging information communicated from the first ISP 100 to the SCP 200 is minimized—only the IP header information field 622, such as that shown in FIG. 5 and the IP data field 624 is communicated to the SCP 200. In comparison, conventional e-mail forwarding systems require transmission of the entire e-mail message. Thus, with the present invention, the bandwidth and time needed to convey the essential routing information is minimized. Second, information available to third-parties is limited, and the bandwidth needed to convey the essential routing information is minimized.

The SCP database 202 is updatable to reflect a change in ISPs. To change ISPs, the user typically completes an written (or e-mail) application. At this point, the new ISP can query whether the user has subscribed or will subscribe to a SCP 200 to provide e-mail portability. The new ISP can then submit a change of the user's literal IP address to the SCP 200, with authorization procedures (such as passwords) to maintain security. The user's "well-known name" address remains unchanged, while e-mail using this address is automatically routed to the new literal IP address. Thus, the e-mail address is portable in that it came with the user to the new ISP.

Also, use of SCP 200 can be used to prevent spamming—a technique used by Internet advertisers to send unsolicited e-mail messages to thousands or often millions of Internet users. Using the appropriate software, an advertiser can "spam" millions of unsuspecting Internet users with unsolicited advertisements virtually instantaneously for almost no cost. The practice of sending mass e-mail messages to or through an ISP overloads the ISP, thus preventing legitimate ISP activities. Spamming prevention is available because the SCP 200 can have a global threshold limit on the volume of addresses for conversion to literal addresses. For example, a global threshold limit is set at two-hundred e-mail messages. If a spammer submits one-thousand mail messages for conversion, then the global threshold limit is exceeded by this volume of mail messages. The SCP 200 then returns an error message to the ISP requesting the conversion service.

Further, the SCP 200 can also provide an enhanced service of batch IP address conversions. The first ISP 100 can have a mail daemon, discussed earlier, with an interpreter object to parse the e-mail submission for the SCP indicator. The SCP indicator example is the "@@" symbol. The ISP mail daemon gathers a "batch" of well known name values. The term "batch" as used means a group of well known name values processed by the SCP 200 as a unit. Accordingly, when the batch of well-known name values are submitted to the SCP 200, a batch of corresponding literal address values are returned to the first ISP 100 that submitted the batch of IP address conversions.

It should be noted that access to SCP 200 need not to be limited to ISPs. The e-mail application programs of the user can be modified to recognize or search for the SCP indicator and to make a conversion job request to the SCP 200 directly. For example, like the SCP, the e-mail application program can extract the well-known name. In the example above, the well-known name "name@@wellknown." The well-known name is then submitted in a conversion job request to the SCP 200. The SCP 200 converts the well-known name address to the literal address value. The literal address value is returned to the e-mail application program. That is, the e-mail application program acts like the first ISP 100 discussed above, without the necessity of first accessing the first ISP 100. But preferably, access is limited to ISPs because of the limited number of ISPs in comparison to the number of Internet subscribers.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope and spirit of the invention.

What is claimed is:

1. An Internet service control point, whereby an Internet user may change Internet Service Providers (ISPs) while maintaining a given well-known e-mail address, implemented by a computer, the Internet service control point comprising:

an address designator that distinguishes the Internet service control point from an ISP;

an e-mail address database having at least a well-known e-mail address field for storing at least part of a well-known e-mail address as a well-known e-mail address value, and a literal e-mail address field for storing a literal e-mail address value that corresponds to the well-known e-mail address value, said well-known e-mail address including a service control point indicator configured for alerting at least one of an ISP and an e-mail program to request an e-mail address translation from said well-known e-mail address to a corresponding literal e-mail address, to which e-mail is to be actually delivered; and a transaction processing object that, when called by an e-mail address translation request from at least one of said message initiating ISP and said sender's e-mail application program, the request having said well-known e-mail address value, accesses said e-mail address database, translates said well-known e-mail address value to said corresponding literal e-mail address value, and returns the corresponding literal e-mail address value to at least one of said message initiating ISP and said sender's e-mail application program, whereby an e-mail message is transmitted directly from at least one of said message initiating ISP and said sender's e-mail application program to said literal e-mail address, thereby bypassing said Internet service control point.

2. The Internet service control point as defined in claim 1 wherein:

the address translation request calling said transaction processing object originates remotely from said e-mail address database; and a part of said well-known e-mail address field defines the service control point.

3. A portable e-mail address translation service system implemented in a computer network for facilitating change of a user's base ISP without changing a well-known e-mail address of the user, the e-mail address system comprising:

an interpreter object for interpreting an e-mail header having a service control point indicator configured for alerting at least one of an ISP and an e-mail program to request an e-mail address translation from said well-known e-mail address to a literal e-mail address corresponding to said well-known e-mail address, said literal e-mail address being an e-mail address to which e-mail is to be actually delivered, a service control point designator that is distinguishable by a message initiating ISP as a translation service, and a well-known destination e-mail address, said e-mail header defining a portable e-mail translation service; and an Internet service control point having an e-mail address database including at least a well-known e-mail address field for storing a well-known e-mail address value and a literal e-mail address field for storing a literal e-mail address value that corresponds to the well-known e-mail address value, the Internet service control point being adapted to return the literal e-mail address value to at least one of said message initiating ISP and said sender's e-mail application program in response to an e-mail address translation request from at least one of said message initiating ISP and said sender's e-mail application program, the request having the well-known e-mail address value, whereby an e-mail message is transmitted directly from at least one of said message initiating ISP and said sender's e-mail application program to said literal e-mail address, thereby bypassing said Internet service control point.

4. The portable e-mail address system of claim 3 wherein said transaction processing object is operable on said Internet service control point.

5. The portable e-mail address system of claim 3 wherein said interpreter object is executable at a first Internet protocol address and said Internet service control point has a second Internet protocol address.

6. The portable e-mail address system of claim 3 wherein said transaction processing object returns a failure value when the corresponding literal e-mail address value cannot be retrieved from said e-mail address database.

7. A method for e-mail address portability comprising the steps of:

providing an e-mail message initiated at at least one of a message initiating ISP and a sender's e-mail application program and having a header with a well-known e-mail address, a service control point indicator configured for alerting at least one of said message initiating ISP and said sender's e-mail application program to request an e-mail address translation from said well-known e-mail address to a literal e-mail address corresponding to said well-known e-mail address, and a service control point designator;

providing a service control point having an updateable database with at least a well-known e-mail address field for storing a well-known e-mail address value, a literal e-mail address field for storing a literal e-mail address value that corresponds to the well-known e-mail address value, and a transaction processing object;

accessing the service control point using the service control point indicator and the service control point designator;

calling the transaction processing object to access the database and to translate the well-known e-mail address value to the corresponding literal e-mail address value;

returning the corresponding literal e-mail address value to at least one of said message initiating ISP and said sender's e-mail application program at which the message was initiated; and sending the e-mail message directly from at least one of said message initiating ISP and said sender's e-mail application program to the literal e-mail address whereby the e-mail message bypasses the service control point.

8. The method for e-mail address portability of claim 7, further comprising the step of:

updating the literal e-mail address value that corresponds to the well-known e-mail address value in the updateable database when a user, identified by the well-known e-mail address, changes ISPs (Internet Service Providers).

9. The method for providing a portable e-mail service of claim 8 wherein the literal e-mail address value is a failure value when the corresponding literal e-mail address value cannot be retrieved from said e-mail address database.

10. The method for providing a portable e-mail service of claim 7 wherein the literal e-mail address value is a failure value when the corresponding literal e-mail address value cannot be retrieved from said e-mail address database.

11. An e-mail address portability system comprising:

means for providing an e-mail message initiated at at least one of a message initiating ISP and a sender's e-mail application program and having a header with a well-known e-mail address, a service control point indicator configured for alerting at least one of said message initiating ISP and said sender's e-mail application program to request an e-mail address translation from said well-known e-mail address to a literal e-mail address corresponding to said well-known e-mail address, and a service control point designator;

means for providing a service control point having an updateable database with at least a well-known e-mail address field for storing a well-known e-mail address value, a literal e-mail address field for storing a literal e-mail address value that corresponds to the well-known e-mail address value, and a transaction processing object;

means for accessing the service control point using the service control point indicator and the service control point designator;

means for calling the transaction processing object to access the database and to translate the well-known e-mail address value to the corresponding literal e-mail address value;

means for returning the corresponding literal e-mail address value to at least one of said message initiating ISP and said sender's e-mail application program at which the message was initiated; and means for sending the e-mail message directly from at least one of said message initiating ISP and said sender's e-mail application program to the literal e-mail address whereby the e-mail message bypasses the service control point.

* * * * *